United States Patent
Enami

(10) Patent No.: US 10,946,917 B2
(45) Date of Patent: Mar. 16, 2021

(54) SEAT FRAME STRUCTURE FOR SADDLE RIDING VEHICLE

(71) Applicant: HONDA MOTOR CO., LTD., Tokyo (JP)

(72) Inventor: Takatomo Enami, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 43 days.

(21) Appl. No.: 16/282,545

(22) Filed: Feb. 22, 2019

(65) Prior Publication Data
US 2019/0300086 A1    Oct. 3, 2019

(30) Foreign Application Priority Data

Mar. 28, 2018   (JP) .............................. JP2018-063127

(51) Int. Cl.
 B62J 1/08    (2006.01)
 B62K 19/12   (2006.01)
 B62K 11/04   (2006.01)

(52) U.S. Cl.
 CPC .................. *B62J 1/08* (2013.01); *B62K 11/04* (2013.01); *B62K 19/12* (2013.01)

(58) Field of Classification Search
None
See application file for complete search history.

(56) References Cited

U.S. PATENT DOCUMENTS

| | | | |
|---|---|---|---|
| 2008/0277980 A1* | 11/2008 | Koda ..................... | B62K 19/30 297/215.16 |
| 2009/0212530 A1* | 8/2009 | Sasnowski ........... | B62K 25/005 280/288.3 |
| 2016/0200387 A1* | 7/2016 | Matsushima .......... | B62K 11/04 180/219 |

FOREIGN PATENT DOCUMENTS

JP    4980096 B2    7/2012

\* cited by examiner

*Primary Examiner* — David R Dunn
*Assistant Examiner* — Christopher E Veraa
(74) *Attorney, Agent, or Firm* — Rankin, Hill & Clark LLP

(57) ABSTRACT

A seat frame extends rearward from a main frame, and the seat frame is a casting divided into right and left two parts, and the seat frame includes an upper cross member and a lower cross member, and the upper cross member and lower cross member couple divided left and right left side frame half body and right side frame half body one another, and the upper cross member and lower cross member are each fastened to the left side frame half body and right side frame half body with fastening members, and a seat is located above the one upper cross member, left side frame half body, and right side frame half body, and the lower cross member faces the upper cross member.

10 Claims, 12 Drawing Sheets

SEAT FRAME STRUCTURE FOR SADDLE RIDING VEHICLE

INCORPORATION BY REFERENCE

The present application claims priority under 35 U.S.C. § 119 to Japanese Patent Application No. 2018-063127 filed on Mar. 28, 2018. The content of the application is incorporated herein by reference in its entirety.

TECHNICAL FIELD

The present invention relates to a seat frame structure for a saddle riding vehicle.

BACKGROUND ART

Conventionally, there has been known a seat frame (seat rail) of a motorcycle, the seat frame (seat rail) is made of a magnesium material and integrally casted with a structure without using a fastening member (for example, see Patent Literature 1).

CITATION LIST

Patent Literature

[Patent Literature 1] Japanese Patent No. 4980096

SUMMARY OF INVENTION

Technical Problem

In Patent Literature 1, since the integrally casted seat frame upsizes a mold, the molding method is restricted for ensuring sufficient strength and rigidity over each portion of the seat frame.

It is an object of the present invention to provide a seat frame structure for a saddle riding vehicle that reduces restriction due to a molding method.

Solution to Problem

A first aspect of the present invention is a seat frame structure for a saddle riding vehicle. The saddle riding vehicle includes a main frame (22) and a seat frame (25). The seat frame (25) is made of a magnesium alloy. The seat frame (25) is fastened to the main frame (22). The seat frame (25) extends rearward from the main frame (22). The seat frame (25) is a casting divided into right and left two parts. The seat frame (25) includes at least two cross members (65, 66). The at least two cross members (65, 66) couple the divided right and left divided portions (25L, 25R) one another. The two cross members (65, 66) are each fastened to the right and left divided portions (25L, 25R) with fastening members. A seat (17) is located above at least the one cross member (65) and the right and left divided portions (25L, 25R). The other cross member (66) faces the one cross member (65).

In a second aspect of the above-described invention, the right and left divided portions (25L, 25R) may be divided into right and left on a center in a vehicle width direction.

In a third aspect of the above-described invention, the right and left divided portions (25L, 25R) may be fastened at respective rear end portions (25c) as viewed in a side view of the vehicle.

In a fourth aspect of the above-described invention, the divided portion (25L, 25R) may have a wall portion (25v) inside which a rib (26B) is disposed. The rib (26B) may extend in a longitudinal direction of the divided portion (25L, 25R). The rib (26B) may be disposed between respective fastening portions (25f, 25j, 25h) for the two cross members (65, 66).

In a fifth aspect of the above-described invention, the divided portion (25L, 25R) may have a U-shaped cross section. The rib (26B) may be disposed on a center line (75) of the U shape.

In a sixth aspect of the above-described invention, a padding portion (26r, 26s) may be formed near a fastening portion (25a, 25b) of the divided portion (25L, 25R) to the main frame (22).

Advantageous Effects of Invention

In the first aspect of the present invention, the seat frame extends rearward from the main frame. The seat frame is a casting divided into right and left two parts. The seat frame includes at least two cross members that couple the divided right and left divided portions one another. The two cross members are each fastened to the right and left divided portions with fastening members. A seat is located above at least the one cross member and the right and left divided portions. The other cross member faces the one cross member. Therefore, the seat frame is a casting divided into right and left two parts, thus ensuring downsizing a mold to reduce restriction due to a molding method. Accordingly, strength and rigidity of the divided portion itself are easily ensured, and the right and left divided portions can be reinforced by coupling the right and left divided portions with the cross members, thus ensuring sufficient strength and rigidity for the seat frame.

In the second aspect of the above-described invention, since the right and left divided portions are divided into right and left on the center in the vehicle width direction, the mold can be downsized, thus ensuring improved run to provide improved quality of the seat frame.

In the third aspect of the above-described invention, the right and left divided portions are fastened at respective rear end portions as viewed in the side view of the vehicle. Accordingly, when respective front end portions of the right and left divided portions are fastened to the main frame, the right and left divided portions can be effectively coupled by fastening the respective rear end portions of the right and left divided portions one another.

In the fourth aspect of the above-described invention, the divided portion has the wall portion inside which the rib is disposed, the rib extends in the longitudinal direction of the divided portion, and the rib is disposed between the respective fastening portions for the two cross members. Accordingly, a load applied to the fastening portion can be dispersed to the rib side by disposing the rib between the fastening portions, thus ensuring the sufficient strength and rigidity.

In the fifth aspect of the above-described invention, the divided portion has the U-shaped cross section, and the rib is disposed on the center line of the U shape. Accordingly, the strength and rigidity of the divided portion can be enhanced by forming the divided portion to have the U-shaped cross section, thus ensuring thinning of the divided portion. Furthermore, disposing the rib ensures the sufficient strength and rigidity of the divided portion.

In the sixth aspect of the above-described invention, the padding portion is formed near the fastening portion of the divided portion to the main frame. Accordingly, the sufficient strength and rigidity can be ensured at the fastening portion of the seat frame to the main frame.

DESCRIPTION OF EMBODIMENTS

The following describes one embodiment of the present invention with reference to the drawings. In the description, descriptions on directions such as front and rear, left and right, and upper and lower are identical to directions with respect to a vehicle body insofar as descriptions are not particularly given. A reference sign FR illustrated in each drawing indicates a front side of the vehicle body, a reference sign UP indicates an upper side of the vehicle body, and a reference sign LH indicates a left side of the vehicle body.

Figure 1:
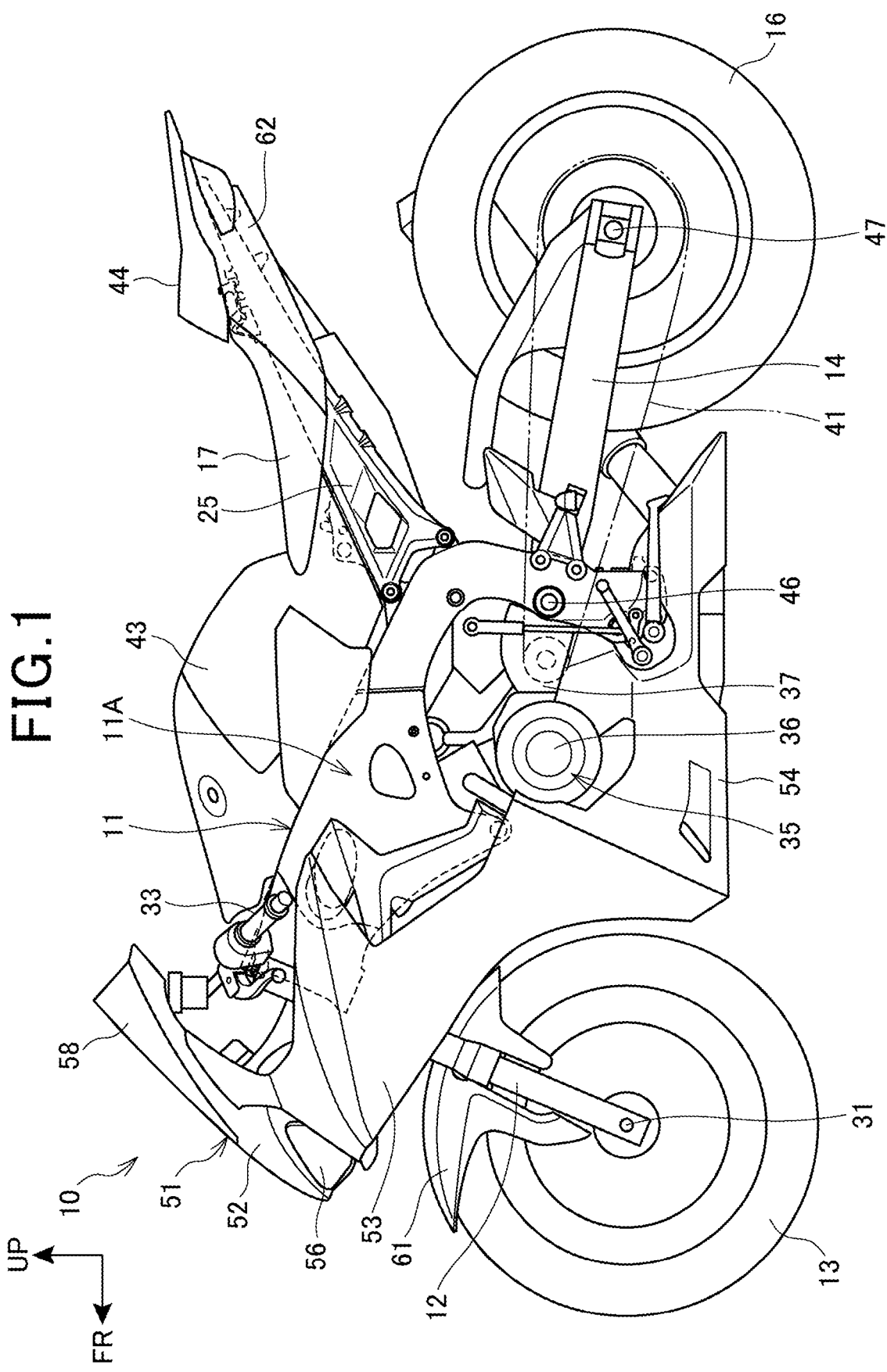
FIG. 1 is a left side view illustrating a motorcycle that includes a seat frame structure of the present invention.
Figure 2:
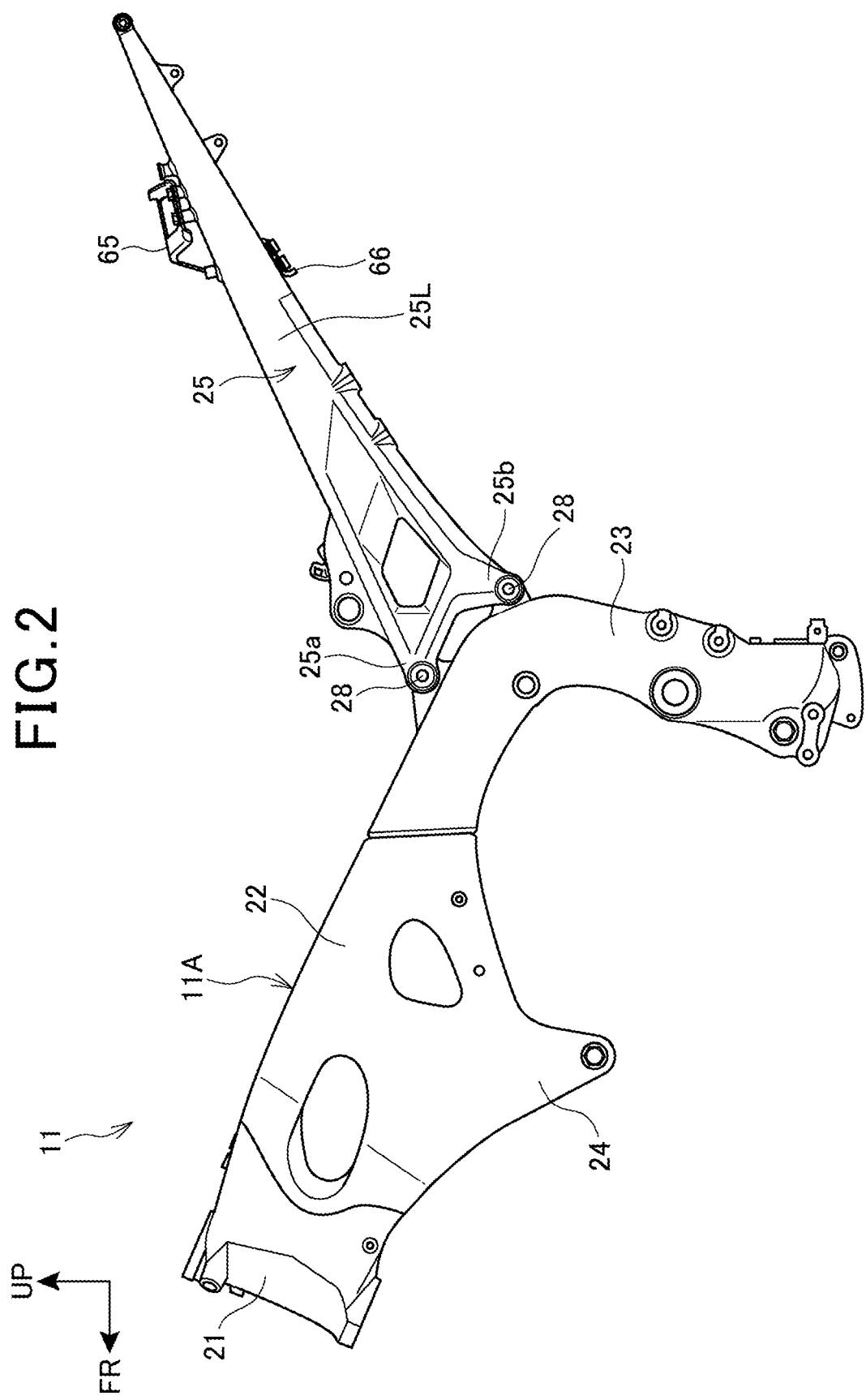
FIG. 2 is a left side view illustrating a body frame.

FIG. 1 is a left side view illustrating a motorcycle 10 that includes a seat frame structure of the present invention. FIG. 2 is a left side view illustrating a body frame 11.

As illustrated in FIG. 1, the motorcycle 10 includes a front wheel 13, a rear wheel 16, and a seat 17. The front wheel 13 is supported to a front end portion of the body frame 11 in a steerable manner via a front fork 12. The rear wheel 16 is swingably supported to a lower portion of the body frame 11 via a swing arm 14. The seat 17 is disposed on a top of the body frame 11. The motorcycle 10 is a saddle riding vehicle that a rider straddles the seat 17 to get on.

As illustrated in FIG. 1 and FIG. 2, the body frame 11 includes a main frame portion 11A and a seat frame 25 that extends rearward and obliquely upward from a rear portion of the main frame portion 11A.

The main frame portion 11A integrally includes a head tube 21, a pair of right and left main frames 22, a pair of right and left pivot frames 23, and a pair of right and left down frames 24.

The head tube 21 is disposed at a front end of the main frame portion 11A, and supports the front fork 12 in a steerable manner. The right and left main frames 22 extend rearward and obliquely downward from the head tube 21, and support a fuel tank 43 on the top. The right and left pivot frames 23 extend downward from respective rear ends of the right and left main frames 22, and swingably support the swing arm 14 with a pivot shaft 46 disposed in a vehicle width direction. The right and left down frames 24 extend downward from lower portions of the right and left main frames 22, and support an engine 35 with the right and left pivot frames 23.

The right and left seat frames 25 are made of a magnesium alloy. The right and left seat frames 25 have front end portions fastened to the right and left main frames 22 with fastening members 28 such as bolts and nuts. The right and left seat frames 25 extend rearward and obliquely upward from the respective right and left main frames 22, and support the seat 17 and a pillion passenger seat 44.

The front fork 12 has an upper end portion to which a handlebar 33 is mounted and a lower end portion where an axle 31 is disposed. The front fork 12 supports the front wheel 13 via the axle 31.

The engine 35 includes a crankcase 36, and the crankcase 36 integrally includes a transmission 37. An output of the transmission 37 is transmitted to the rear wheel 16 via a chain 41. At the rear of the seat 17, the pillion passenger seat 44 is disposed. The swing arm 14 has a rear end portion where an axle 47 is disposed. The swing arm 14 supports the rear wheel 16 via the axle 47.

The motorcycle 10 has a front portion and a lower portion covered with a cowling 51. The cowling 51 includes an upper cowl 52, a middle cowl 53, and a lower cowl 54.

The upper cowl 52 covers a peripheral area of a headlight 56, and includes a windshield 58 at the center of the top. The middle cowl 53 extends rearward and downward from an outside of the upper cowl 52 in the vehicle width direction to cover the front portion of the vehicle body from both sides. The lower cowl 54 covers the lower portion of the vehicle body including the engine 35.

The front wheel 13 is covered with a front fender 61 from the upper side, and the rear wheel 16 is covered with a rear fender 62 from the upper side.

Figure 3:
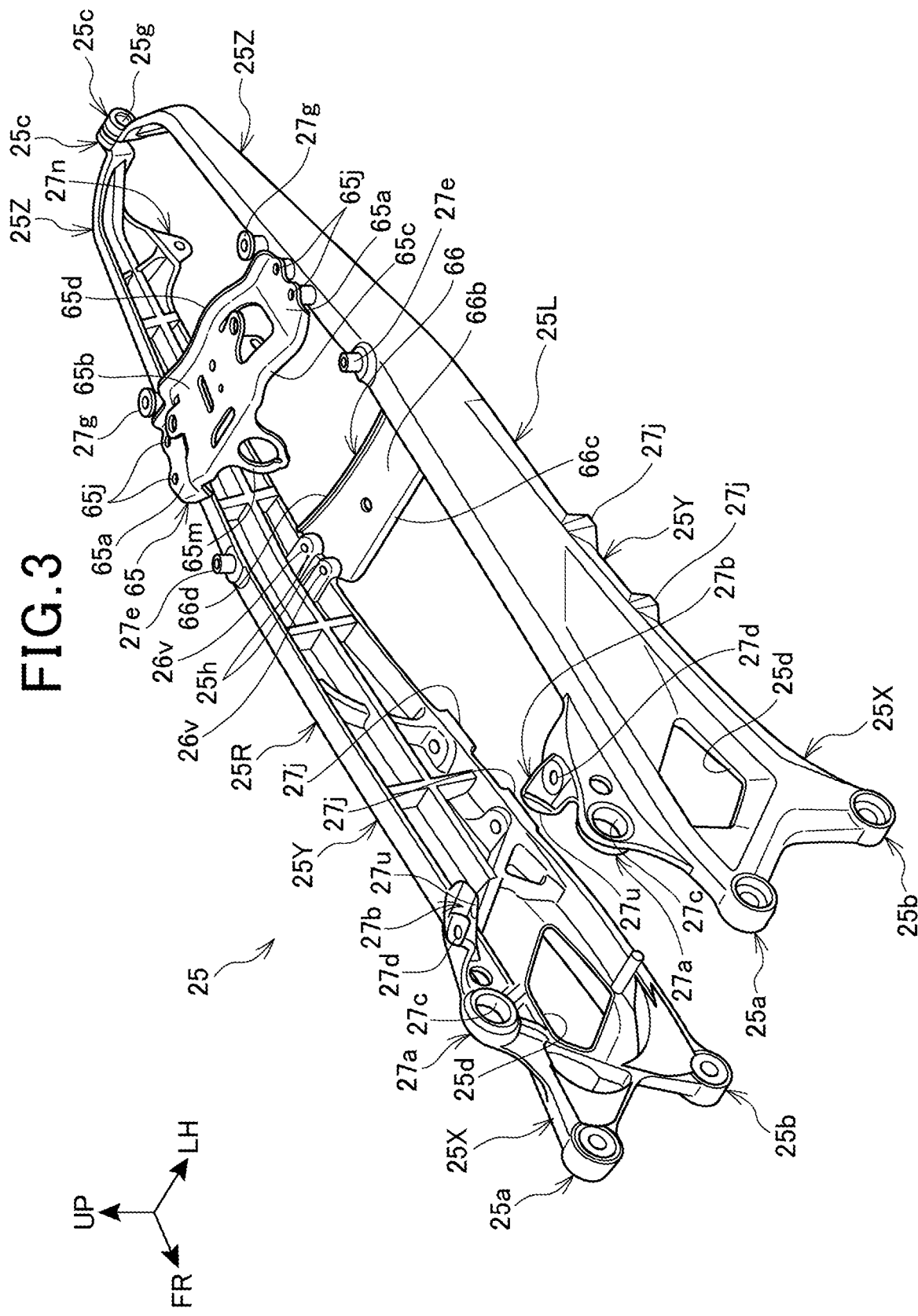
FIG. 3 is a perspective view of the seat frame viewed from an obliquely upper side.
Figure 4:
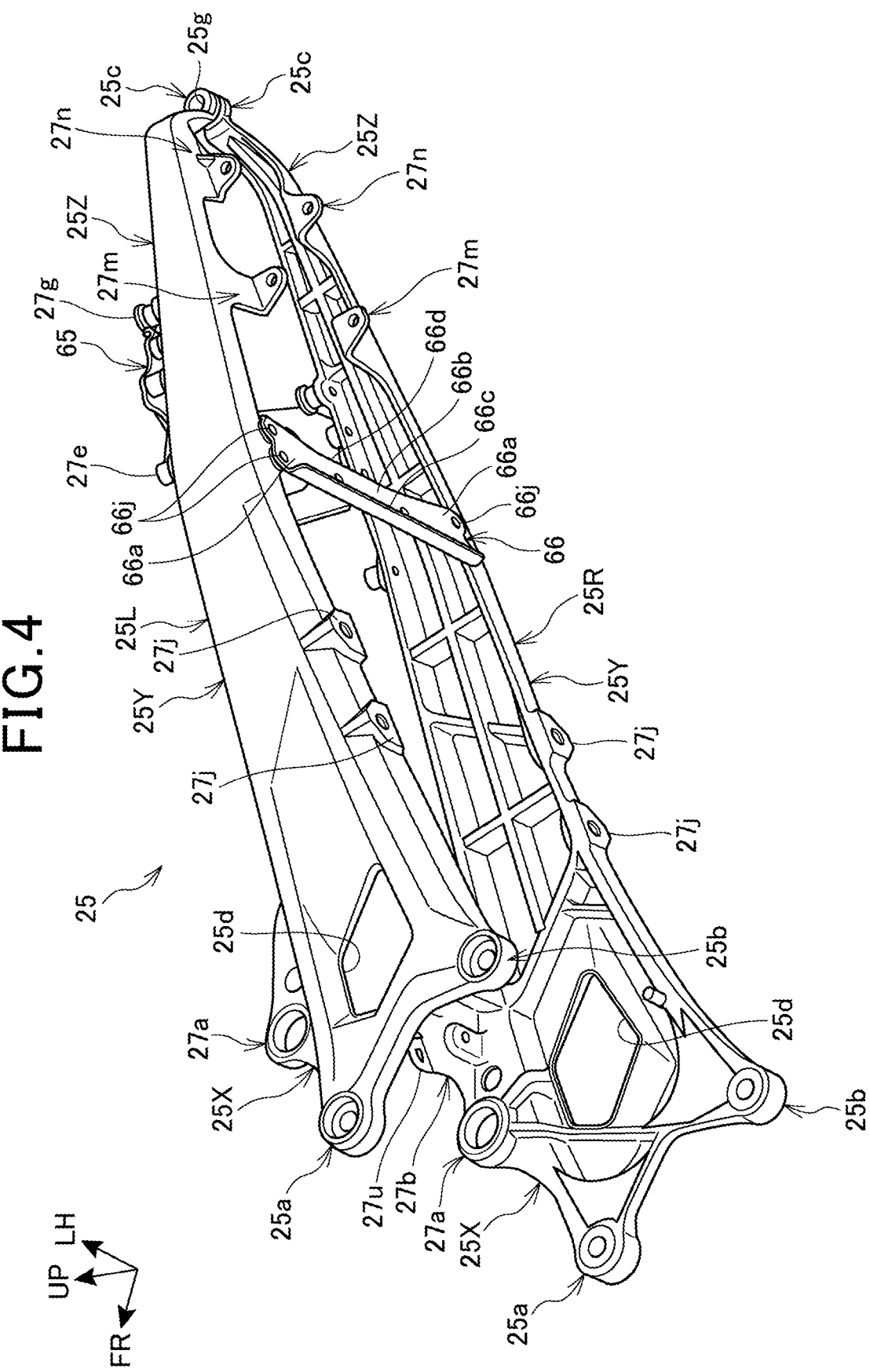
FIG. 4 is a perspective view of the seat frame viewed from an obliquely lower side.

FIG. 3 is a perspective view of the seat frame 25 viewed from an obliquely upper side. FIG. 4 is a perspective view of the seat frame 25 viewed from an obliquely lower side.

As illustrated in FIG. 3 and FIG. 4, the seat frame 25 includes a left and right pair of a left side frame half body 25L and a right side frame half body 25R, and an upper and lower pair of an upper cross member 65 and a lower cross member 66 that couple the left side frame half body 25L to the right side frame half body 25R.

The left side frame half body 25L and the right side frame half body 25R, and the upper cross member 65 and the lower cross member 66 are each made of a magnesium alloy and integrally molded by die-cast molding.

Thus, the main portion of the seat frame 25 is separated into the left side frame half body 25L and the right side frame half body 25R, and the upper cross member 65 and the lower cross member 66 are disposed as separate bodies from the main portion of the seat frame 25. This ensures downsizing the respective molds for the die-cast molding of the left side frame half body 25L, right side frame half body 25R, upper cross member 65 and lower cross member 66. For the upper cross member 65 and the lower cross member 66, the molds may be formed of a steel plate by press molding.

The left side frame half body 25L and the right side frame half body 25R are symmetrical in shape, and names and reference numerals of the respective portions are identical. Therefore, the following representatively describes only the left side frame half body 25L. Depending on the drawing, only the right side frame half body 25R, or the left side frame half body 25L and the right side frame half body 25R will be described.

The left side frame half body 25L has a front end portion where a pair of upper and lower main-frame-portion mounted portions 25a and 25b are disposed. The main-frame-portion mounted portions 25a and 25b are mounted to the main frame 22. The left side frame half body 25L has a rear end portion where a rear end joint portion 25c is disposed. The rear end joint portion 25c joins the left side frame half body 25L and the right side frame half body 25R.

The left side frame half body 25L has a front portion where an opening 25d is formed for weight reduction. Since the opening 25d is exposed outside (see FIG. 1), designability of the motorcycle 10 (see FIG. 1) can be improved.

The upper cross member 65 is fastened to respective tops of the left side frame half body 25L and the right side frame half body 25R with a plurality of bolts. The fastening bolts are inserted through a plurality of bolt insertion holes 65j provided on both ends of the upper cross member 65.

The lower cross member 66 is fastened to respective lower portions of the left side frame half body 25L and the right side frame half body 25R with a plurality of bolts. The fastening bolts are inserted through bolt insertion holes 66j provided on both ends of the lower cross member 66.

In FIG. 3, the upper cross member 65 integrally includes a pair of right and left fastening portions 65a, a coupling portion 65b, a front bent portion 65c, and a rear bent portion 65d.

The right and left fastening portions 65a are disposed on both ends in the vehicle width direction. The right and left fastening portions 65a are portions with a plurality of bolt insertion holes 65j, and fastened to the tops of the left side frame half body 25L and the right side frame half body 25R. The coupling portion 65b is a portion to couple the right fastening portion 65a to the left fastening portion 65a. The front bent portion 65c bends downward from front edges of the right and left fastening portions 65a and the coupling portion 65b. The rear bent portion 65d bends upward from rear edges of the right and left fastening portions 65a and the coupling portion 65b.

Thus, disposing the front bent portion 65c and the rear bent portion 65d on the upper cross member 65 ensures the enhanced rigidity of the upper cross member 65, and eventually, ensures the enhanced rigidity of the seat frame 25.

In FIG. 4, the lower cross member 66 integrally includes a pair of right and left fastening portions 66a, a coupling portion 66b, a front bent portion 66c, and a rear bent portion 66d.

The right and left fastening portions 66a are disposed on both ends in the vehicle width direction. The right and left fastening portions 66a are portions with a plurality of bolt insertion holes 66j, and fastened to the lower portions of the left side frame half body 25L and the right side frame half body 25R. The coupling portion 66b is a flat plate-shaped portion to couple the right fastening portion 66a to the left fastening portion 66a. The front bent portion 66c bends downward from front edges of the right and left fastening portions 66a and the coupling portion 66b. The rear bent portion 66d bends upward from rear edges of the right and left fastening portions 66a and the coupling portion 66b.

Thus, disposing the front bent portion 66c and the rear bent portion 66d on the lower cross member 66 ensures the enhanced rigidity of the lower cross member 66, and eventually, ensures the enhanced rigidity of the seat frame 25.

The type of magnesium alloy and chemical composition in the seat frame 25 of this embodiment are AM50A (ASTM standard. Al: 4.4 to 5.4 wt %, Mn: 0.26 to 0.6 wt %, Zn: 0.22 wt % or less, Si: 0.10 wt % or less, Cu: 0.010 wt % or less, Ni: 0.002 wt % or less, Fe: 0.004 wt % or less, others: 0.02 wt %), or AM60B (ASTM standard. Al: 5.5 to 6.5 wt %, Mn: 0.24 to 0.6 wt %, Zn: 0.22 wt % or less, Si: 0.10 wt % or less, Cu: 0.010 wt % or less, Ni: 0.002 wt % or less, Fe: 0.005 wt % or less, others: 0.02 wt %), and rare earth (for example, Ce, La, and Nd) of 0.2 to 0.5 wt % is further added.

The material of AM50A or AM60B has characteristics of high ductility and high impact resistance, and is used for a steering wheel of an automobile and the like. Adding the above-described rare earth can enhance corrosion resistance.

For this seat frame 25, adding the rare earth of 2.0 to 5.0 wt % to the above-described material of AM50A or AM60B can enhance high temperature strength in addition to the corrosion resistance.

Figure 5:
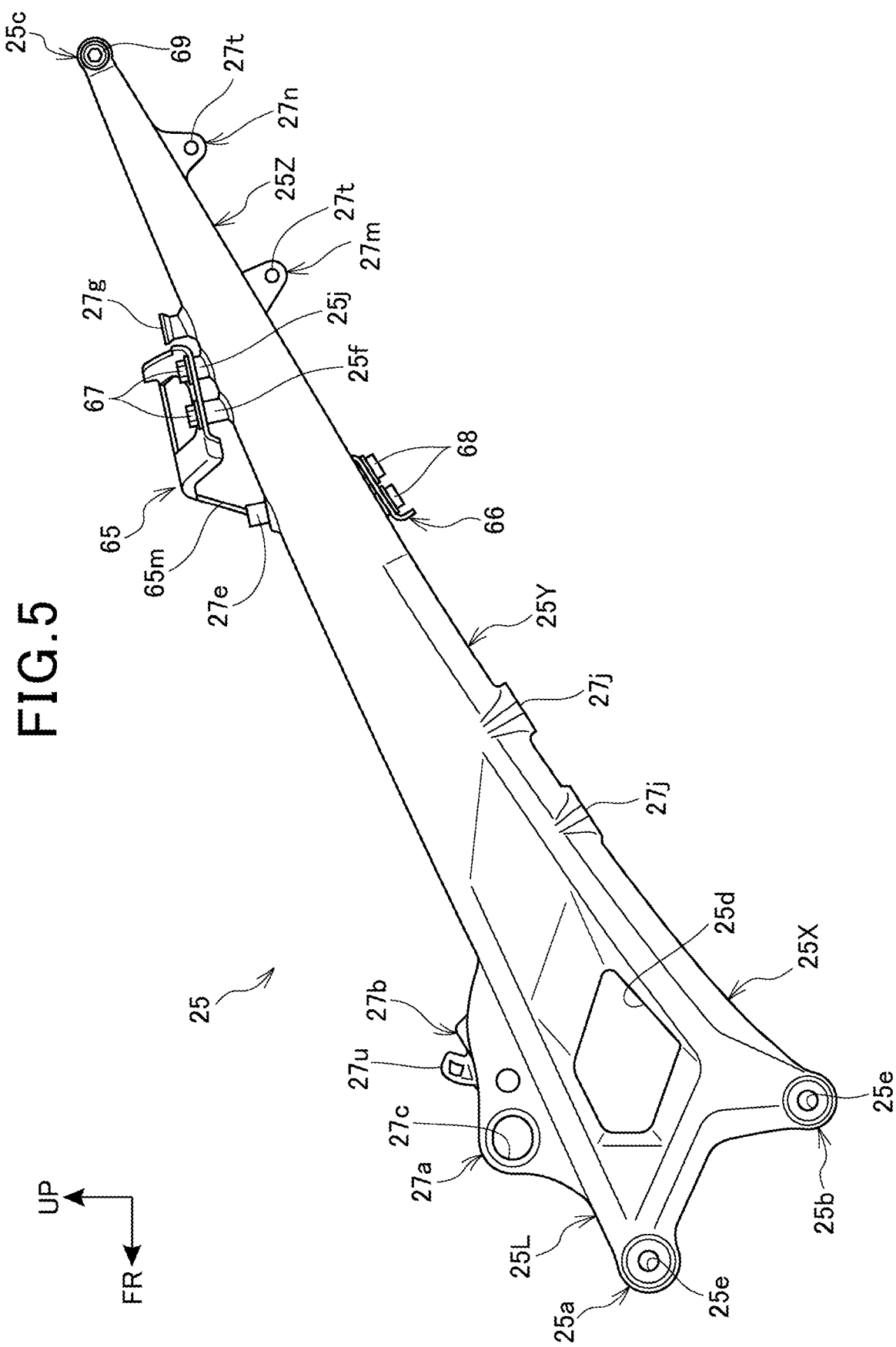
FIG. 5 is a left side view illustrating the seat frame.

FIG. 5 is a left side view illustrating the seat frame 25.

The left side frame half body 25L is formed to have a width gradually narrowed from the front end toward the rear end.

The left side frame half body 25L includes bolt insertion holes 25e, a pair of upper boss portions 25f and 25j, and a bolt insertion hole 25g (see FIG. 3 and FIG. 4). The bolt insertion holes 25e are provided at the respective main-frame-portion mounted portions 25a and 25b. The pair of upper boss portions 25f and 25j are disposed on the top. The bolt insertion hole 25g is provided at the rear end joint portion 25c. The left side frame half body 25L and the right side frame half body 25R each include the bolt insertion hole 25g through which a bolt 69 is inserted, and the bolt 69 has a distal end portion where a nut (not illustrated) is screwed. This fastens the rear end joint portions 25c of the left side frame half body 25L and the right side frame half body 25R one another with the bolt 69 and the nut.

The respective rear end joint portions 25c of the left side frame half body 25L and the right side frame half body 25R (see FIG. 3) may be configured such that one rear end joint portion 25c includes the bolt insertion hole 25g and the other rear end joint portion 25c includes a screw hole so as to screw the distal end portion of the bolt 69 inserted through the bolt insertion hole 25g into the above-described screw hole.

The pair of upper boss portions 25f and 25j are portions to which the upper cross member 65 is fastened. The pair of upper boss portions 25f and 25j are integrally formed with the top of the left side frame half body 25L to project upward. The upper boss portions 25f and 25j include screw holes 26t and 26u, respectively (see FIG. 11), and respective bolts 67 are screwed into the screw holes 26t and 26u to fasten the upper cross member 65.

In FIG. 3 and FIG. 5, the left side frame half body 25L has the lower portion where a pair of inner boss portions 25h are integrally formed so as to each project inward in the vehicle width direction. The pair of inner boss portions 25h are portions to which the lower cross member 66 is fastened. The pair of inner boss portions 25h each include a screw hole 26v, and bolts 68 are screwed into the screw holes 26v to fasten the lower cross member 66.

Figure 6:
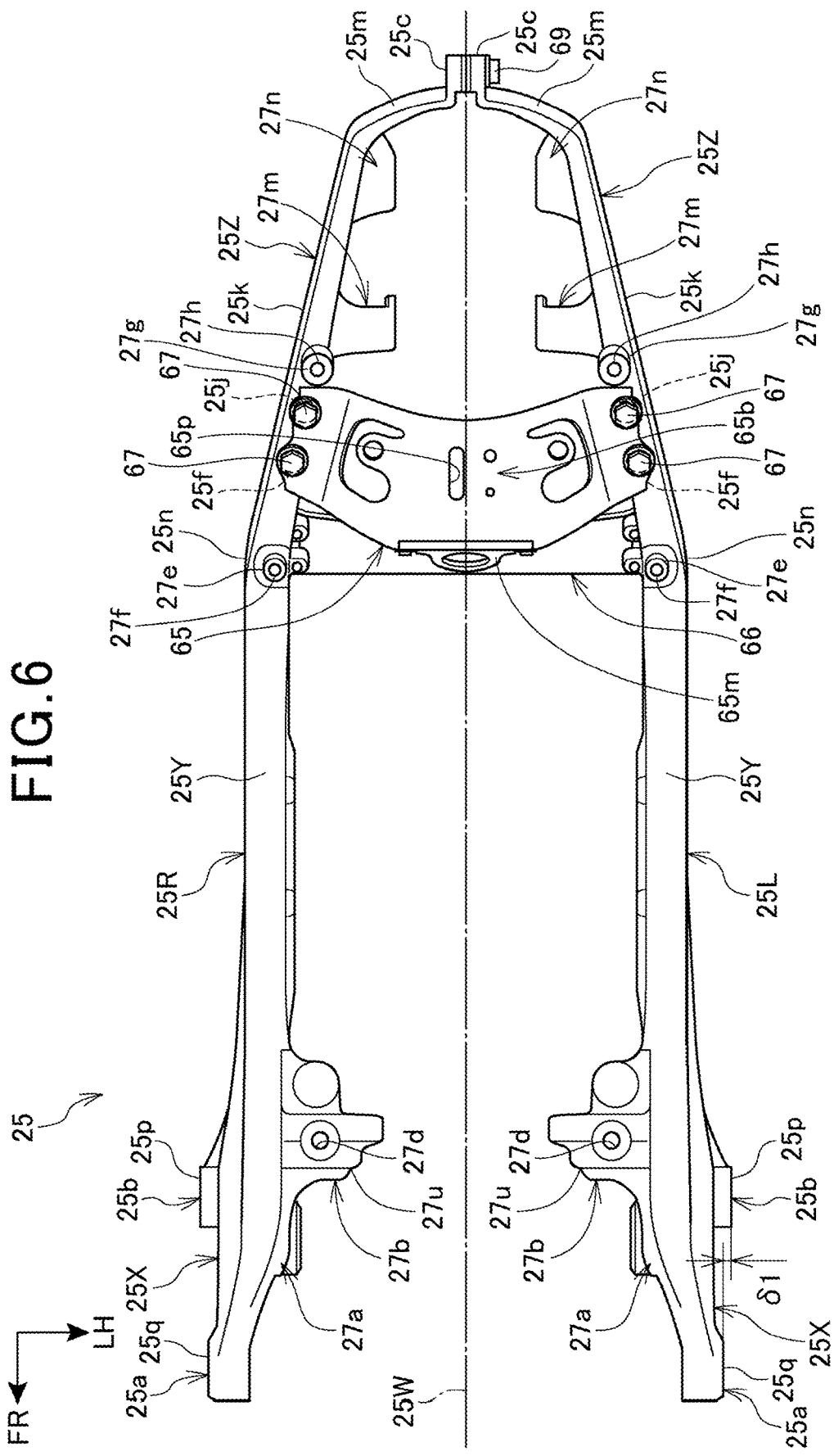
FIG. 6 is a plan view illustrating the seat frame.
Figure 7:
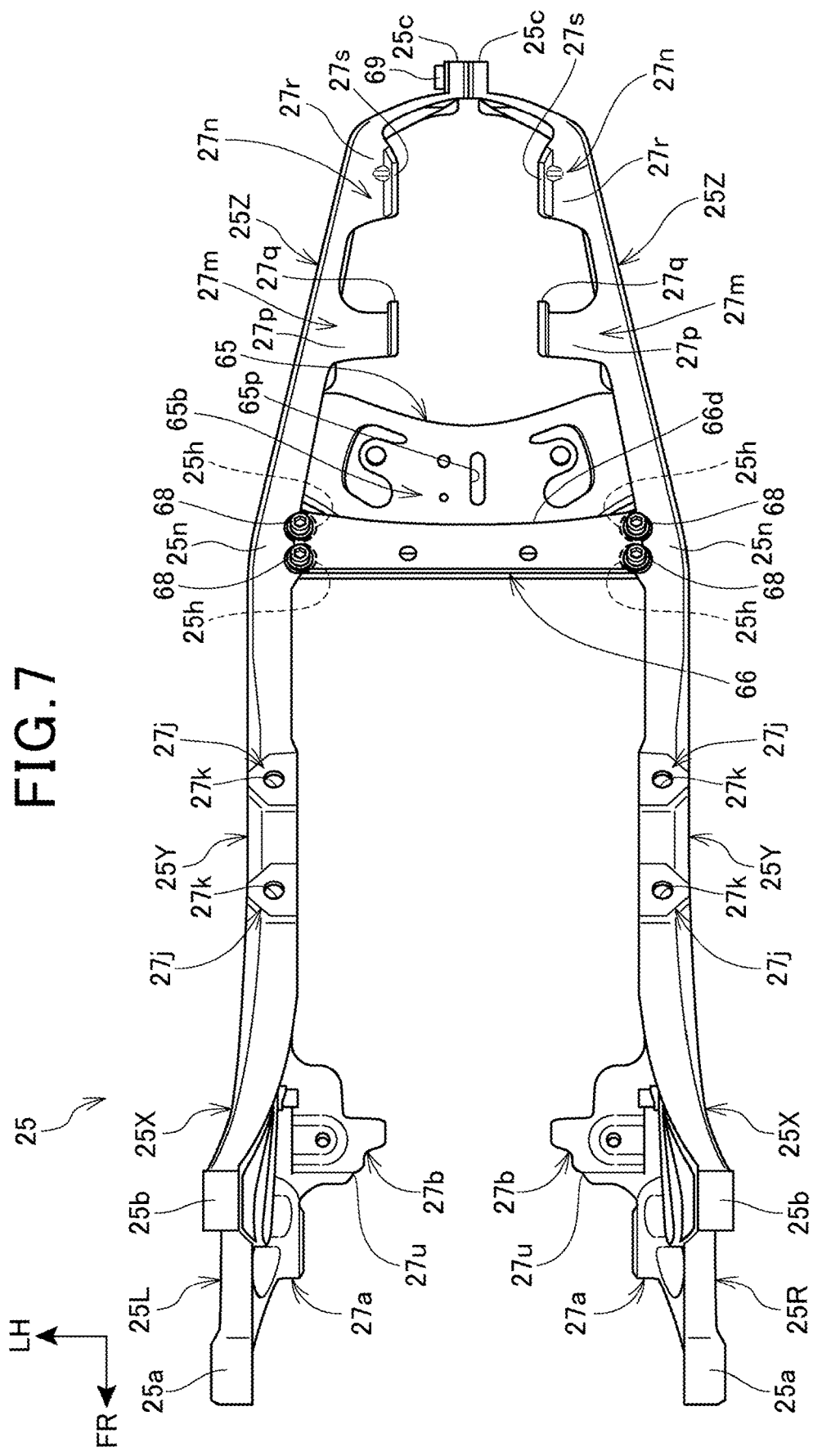
FIG. 7 is a bottom view illustrating the seat frame.

FIG. 6 is a plan view illustrating the seat frame 25. FIG. 7 is a bottom view illustrating the seat frame 25.

As illustrated in FIG. 6, when a center line 25W extending in a front-rear direction is drawn on the seat frame 25, the seat frame 25 is symmetrical with respect to the center line 25W. The center line 25W matches a vehicle body centerline passing through the center in the vehicle width direction of the motorcycle 10 (see FIG. 1) and extending in the front-rear direction. That is, the seat frame 25 is divided into the left side frame half body 25L and the right side frame half body 25R on the center in the vehicle width direction.

The left side frame half body 25L integrally includes a front portion 25X, a middle portion 25Y, and a rear portion 25Z.

The front portion 25X is gradually displaced outward in the vehicle width direction toward the front of the vehicle. The middle portion 25Y extends rearward from a rear end of the front portion 25X. The rear portion 25Z is gradually displaced inward in the vehicle width direction from a rear end of the middle portion 25Y toward the rear.

The front portion 25X includes the main-frame-portion mounted portions 25a and 25b. The lower main-frame-portion mounted portion 25b (specifically, outer surface 25p) projects outward in the vehicle width direction with respect to the upper main-frame-portion mounted portion 25a (specifically, outer surface 25q) by a projection amount 51.

In FIG. 3 and FIG. 6, the front portion 25X has the top where a tank fastening portion 27a and a cover member fastening portion 27b are integrally disposed. The tank fastening portion 27a fastens a rear portion of the fuel tank 43 (see FIG. 1). The cover member fastening portion 27b fastens a tank shelter (not illustrated), which covers the fuel tank 43, and an inertial measurement unit (IMU) cover (not illustrated).

The tank fastening portion 27a is a portion projecting most upward of the front portion 25X, and a mounting hole 27c for mounting the fuel tank 43 is provided. The cover member fastening portion 27b is a thin-walled portion projecting most inward in the vehicle width direction of the front portion 25X, and a screw hole 27d, into which a fastening bolt (not illustrated) is screwed, is provided in a vertical direction. Even the cover member fastening portion 27b as the thin portion is thin-walled, the strength and rigidity are ensured by die-cast molding.

For example, when a steel plate stay is disposed as a separate body instead of the cover member fastening portion 27b for supporting the tank shelter and the IMU cover as the cover members, a fastening member to fasten the steel plate stay to the left side frame half body is necessary (increase in the number of components, increase in man-hour for assembly). Further, the weights of the stay itself and the fastening member become larger than the weight of the cover member fastening portion 27b (increase in weight).

In FIG. 6, the rear portion 25Z includes an inclined portion 25k, a bent portion 25m, and the rear end joint portion 25c. The inclined portion 25k extends from the rear end of the middle portion 25Y while linearly inclining inward in the vehicle width direction. The bent portion 25m bends inward in the vehicle width direction from the rear end of the inclined portion 25k. The rear end joint portion 25c projects rearward from the end portion in the vehicle width direction of the bent portion 25m.

The inclined portion 25k includes the pair of upper boss portions 25f and 25j.

A coupling portion 25n of the middle portion 25Y and the rear portion 25Z, specifically, a top of the coupling portion 25n integrally includes a seat fastening portion 27e, which fastens the rear end portion of the seat 17 (see FIG. 1), so as to project upward. The seat fastening portion 27e includes a screw hole 27f into which a fastening bolt is screwed.

Further, the inclined portion 25k of the rear portion 25Z has a top where a belt fastening portion 27g is integrally disposed so as to project upward. The belt fastening portion 27g fastens an end portion of a belt for the seat (not illustrated) disposed on the pillion passenger seat 44 (see FIG. 1). The belt fastening portion 27g includes a screw hole 27h into which a fastening bolt is screwed.

The upper cross member 65 is curved so as to be convex toward the vehicle front.

The coupling portion 65b of the upper cross member 65 includes a seat lock device (not illustrated) that engages the openable/closable pillion passenger seat 44 (see FIG. 1) and locks the engagement state. The coupling portion 65b includes an elongated hole 65p extending in the front-rear direction. The elongated hole 65p is a portion through which a striker (not illustrated) disposed on a lower surface of the pillion passenger seat 44 is inserted, and the striker is engageable with the lock device.

As illustrated in FIG. 7, the coupling portion 25n of the middle portion 25Y and the rear portion 25Z includes the pair of inner boss portions 25h. The pair of inner boss portions 25h may be disposed on the middle portion 25Y close to the coupling portion 25n or the rear portion 25Z close to the coupling portion 25n.

The middle portion 25Y has the lower portion where a pair of bracket fastening portions 27j, which fasten a step bracket (not illustrated), is disposed. To the step bracket, a pillion step (not illustrated) on which the pillion passenger places his/her feet is mounted. The bracket fastening portion 27j includes a screw hole 27k into which a fastening bolt is screwed.

The lower cross member 66 extends in the vehicle width direction, and is curved such that the rear bent portion 66d becomes convex toward the vehicle front.

In FIG. 6 and FIG. 7, a part (front portion) of the upper cross member 65 overlaps the lower cross member 66.

As illustrated in FIG. 6, the left side frame half body 25L and the right side frame half body 25R are divided into left and right on the center in the vehicle width direction, that is, the vehicle body centerline (matching the center line 25W). This ensures downsizing the mold, thus improving run to provide the improved quality of the seat frame 25.

As viewed in the side view of the vehicle, the left side frame half body 25L and the right side frame half body 25R as the left and right divided portions are fastened at the rear end joint portions 25c as the respective rear end portions.

With this configuration, when the respective front end portions of the left side frame half body 25L and the right side frame half body 25R are fastened to the main frame 22, the left side frame half body 25L and the right side frame half body 25R are effectively coupled by fastening the rear end joint portions 25c of the left side frame half body 25L and the right side frame half body 25R one another.

Figure 8:
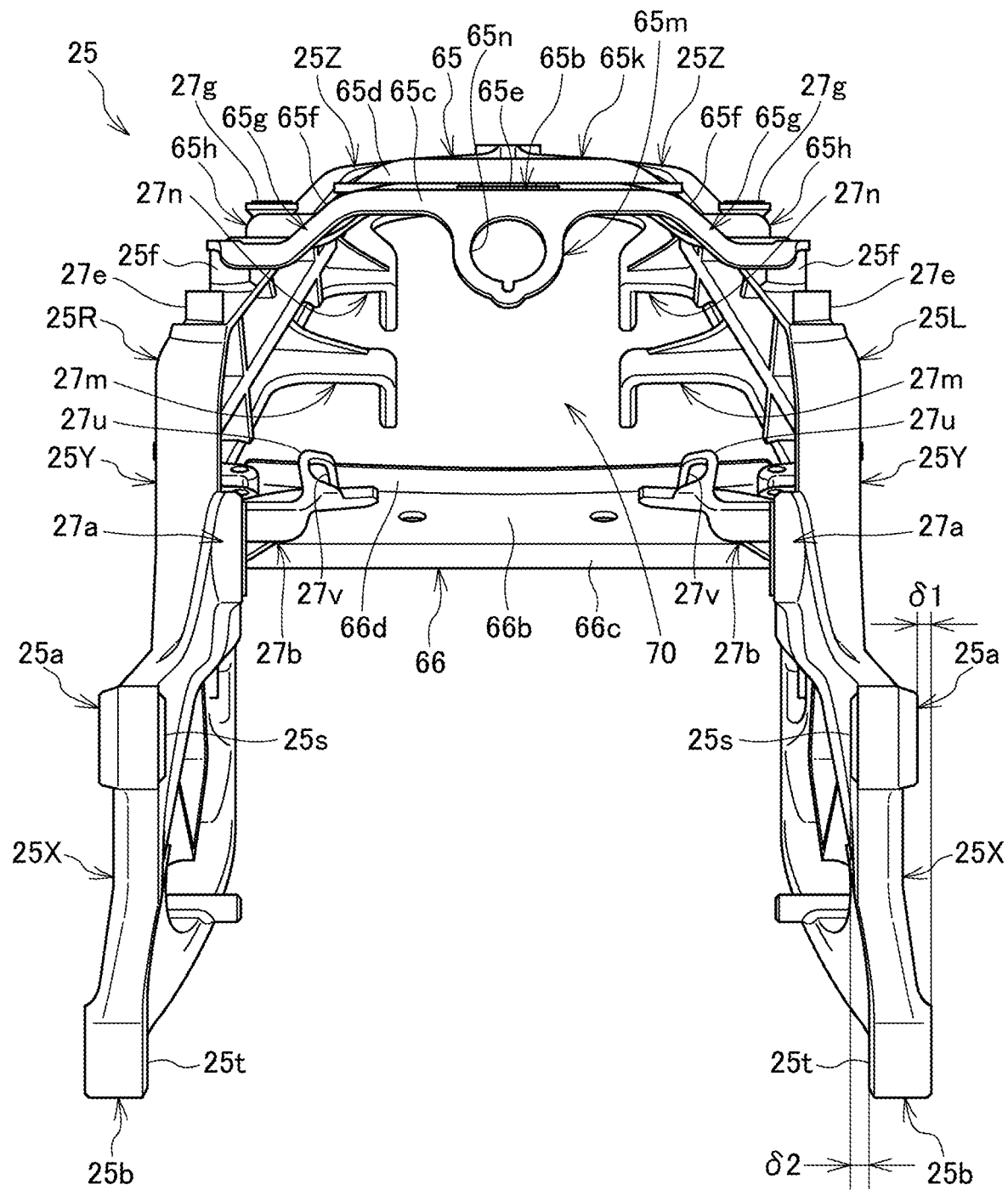
FIG. 8 is a front view illustrating the seat frame.
Figure 9:
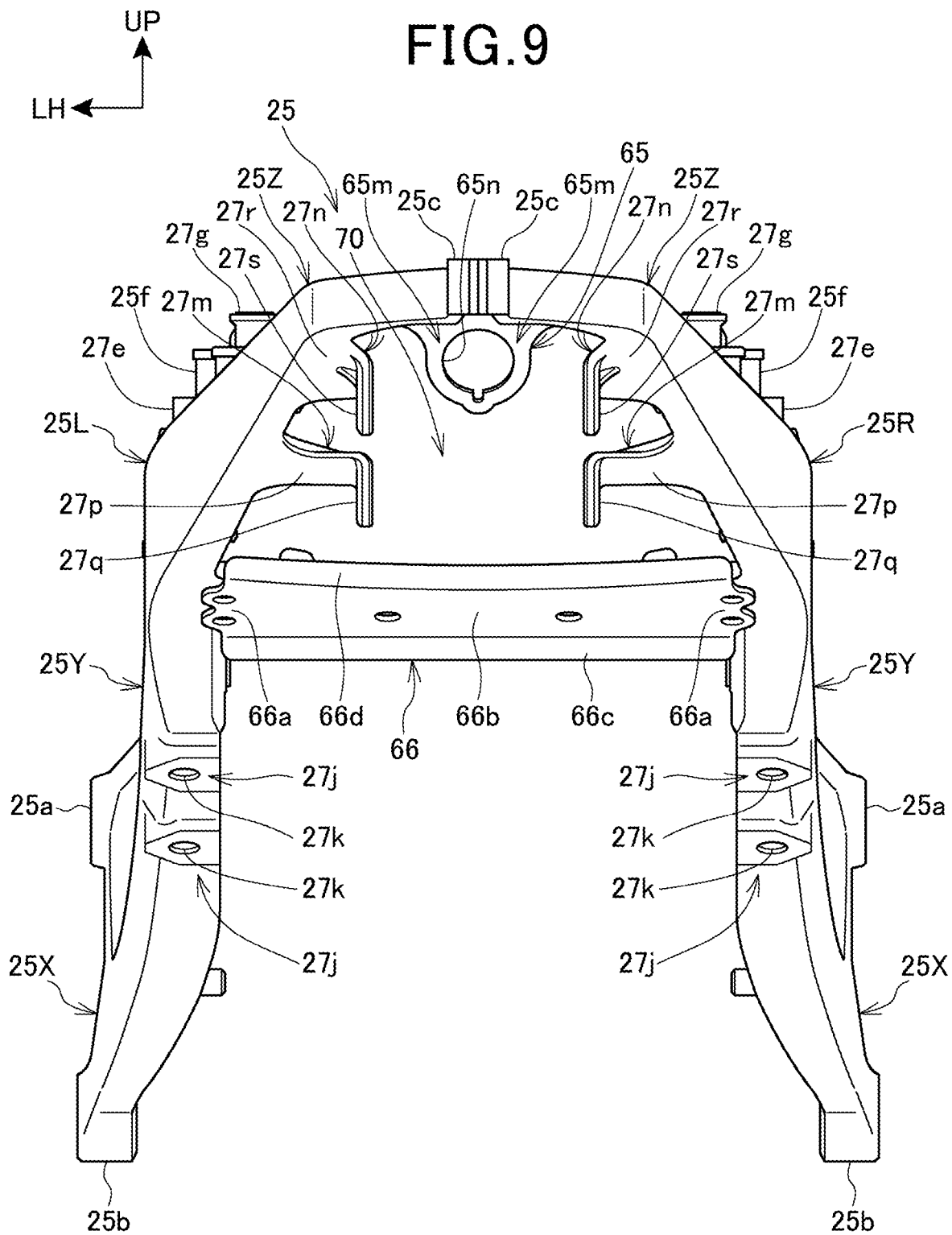
FIG. 9 is a back view illustrating the seat frame.

FIG. 8 is a front view illustrating the seat frame 25. FIG. 9 is a back view illustrating the seat frame 25.

As illustrated in FIG. 8, the upper main-frame-portion mounted portion 25a (specifically, internal surface 25s) projects inward in the vehicle width direction by a projection amount 52 with respect to the lower main-frame-portion mounted portion 25b (specifically, internal surface 25t).

From the above-described FIG. 6 and FIG. 8, the lower main-frame-portion mounted portion 25b is arranged outward in the vehicle width direction compared with the upper main-frame-portion mounted portion 25a. Accordingly, a distance between the right and left main-frame-portion mounted portions 25b can be more increased, thus ensuring firmly fixing the seat frame 25 to the right and left main frames 22 (see FIG. 2).

In FIG. 8, the coupling portion 65b of the upper cross member 65 includes a flat coupling-portion center portion 65e disposed on the center in the vehicle width direction, and a pair of right and left coupling-portion inclined portions 65f inclined sideward and obliquely downward from both ends of the coupling-portion center portion 65e.

The upper cross member 65 includes a member center portion 65k, a pair of right and left member inclined portions 65g, and a pair of right and left member side portions 65h.

The member center portion 65k is formed over the coupling-portion center portion 65e, a front portion of the coupling-portion center portion 65e on the front bent portion 65c, and a rear portion of the coupling-portion center portion 65e on the rear bent portion 65d.

The member inclined portion 65g is formed over the coupling-portion inclined portion 65f, a front portion of the coupling-portion inclined portion 65f on the front bent portion 65c, and a rear portion of the coupling-portion inclined portion 65f on the rear bent portion 65d.

The member side portion 65h is formed over the fastening portion 65a, a front portion of the fastening portion 65a on the front bent portion 65c, and a rear portion of the fastening portion 65a on the rear bent portion 65d.

As described above, the rigidity of the upper cross member 65 can be enhanced by forming the upper cross member 65 in a shape with unevenness in the vertical direction.

The front bent portion 65c of the upper cross member 65 integrally includes a forward inclined extending portion 65m that extends forward and obliquely downward. The forward inclined extending portion 65m includes a circular mounting hole 65n. A key cylinder (not illustrated) constituting the above-described seat lock device is inserted through the mounting hole 65n, and the key cylinder is retained to the mounting hole 65n by a retaining ring (not illustrated).

As illustrated in FIG. 9, the front portion 25X of the left side frame half body 25L curvedly extends from the front end to the rear end side so as to be convex inward in the vehicle width direction. In back view, most part of the upper cross member 65 overlaps the respective rear portions 25Z of the left side frame half body 25L and the right side frame half body 25R.

In FIG. 8 and FIG. 9, the seat frame 25 includes a space 70 enclosed by the respective rear portions 25Z of the left side frame half body 25L and the right side frame half body 25R, the upper cross member 65, and the lower cross member 66. That is, the respective rear portions 25Z of the left side frame half body 25L and the right side frame half body 25R, the upper cross member 65, and the lower cross member 66 constitute a three-dimensional structure that forms the space 70. Accordingly, also the three-dimensional structure can enhance the rigidity and strength of the seat frame 25.

As illustrated in FIG. 5, FIG. 6, and FIG. 9, the inclined portion 25k of the rear portion 25Z has a lower portion where a pair of stay fastening portions 27m and 27n are integrally disposed. The pair of stay fastening portions 27m and 27n fasten a fender stay (not illustrated) for mounting the rear fender 62 (see FIG. 1).

The stay fastening portion 27m includes an inward extending portion 27p and a downward extending portion 27q. The inward extending portion 27p extends inward in the vehicle width direction from the lower portion of the inclined portion 25k. The downward extending portion 27q extends downward from a distal end of the inward extending portion 27p. The stay fastening portion 27n includes an inward extending portion 27r and a downward extending portion 27s. The inward extending portion 27r extends inward in the vehicle width direction from the lower portion of the inclined portion 25k. The downward extending portion 27s extends downward from a distal end of the inward extending portion 27r.

The downward extending portions 27q and 27s include bolt insertion holes 27t through which bolts (not illustrated) for fastening the fender stay are inserted.

Figure 10:
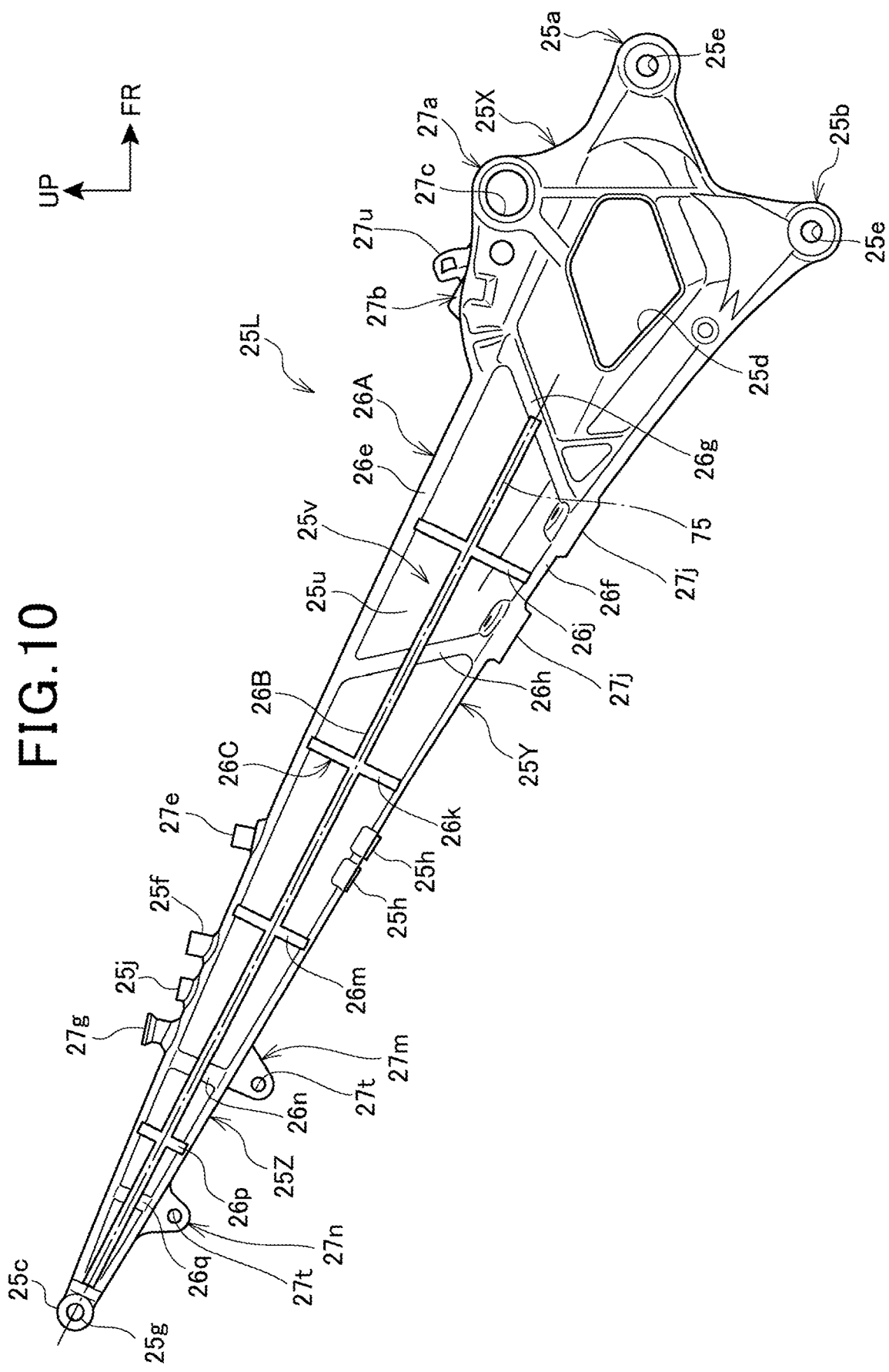
FIG. 10 is a right side view illustrating an inner surface of a left side frame half body.
Figure 11:
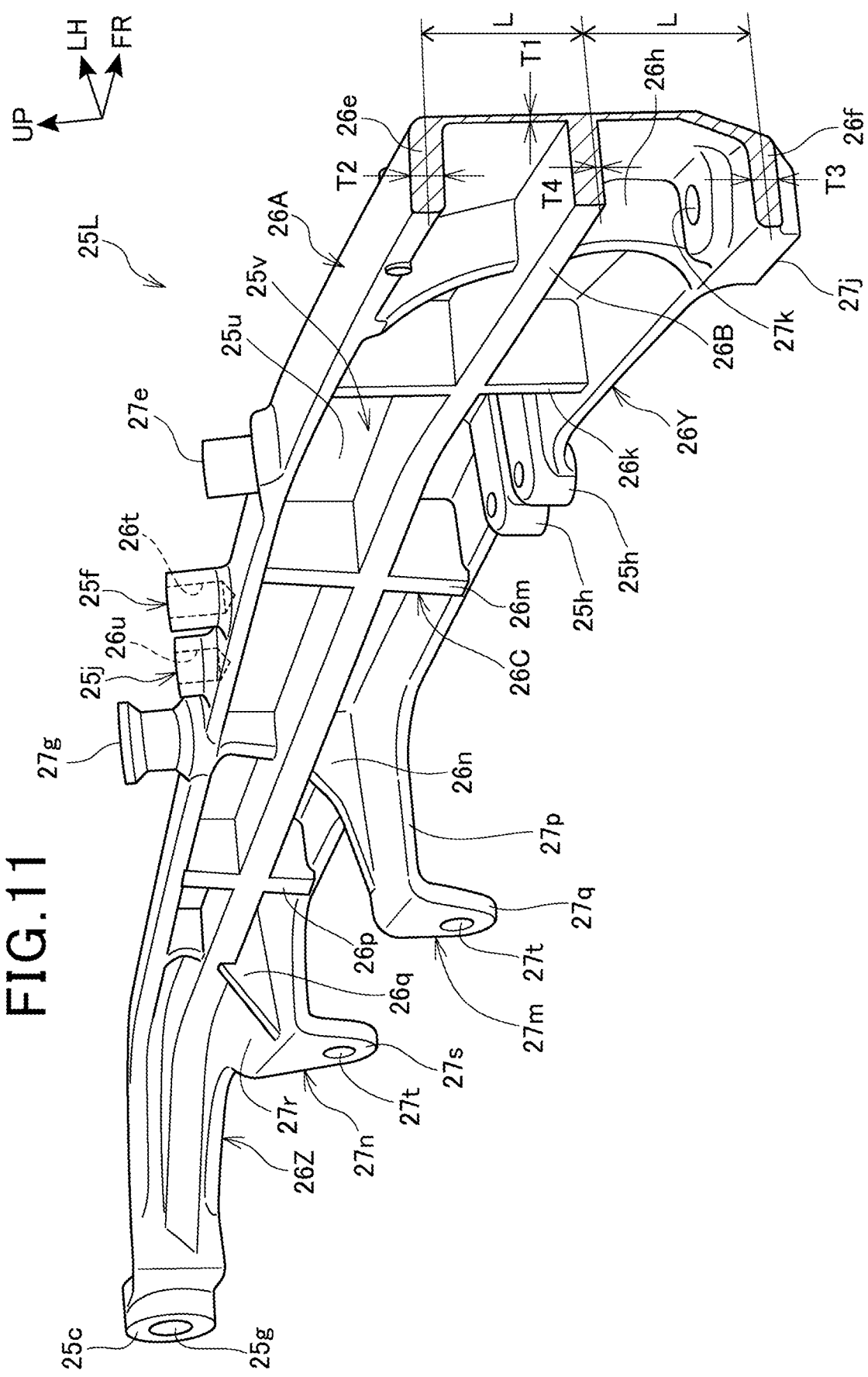
FIG. 11 is a perspective view illustrating the inner surface and a lateral cross-sectional surface of the left side frame half body.
Figure 12:
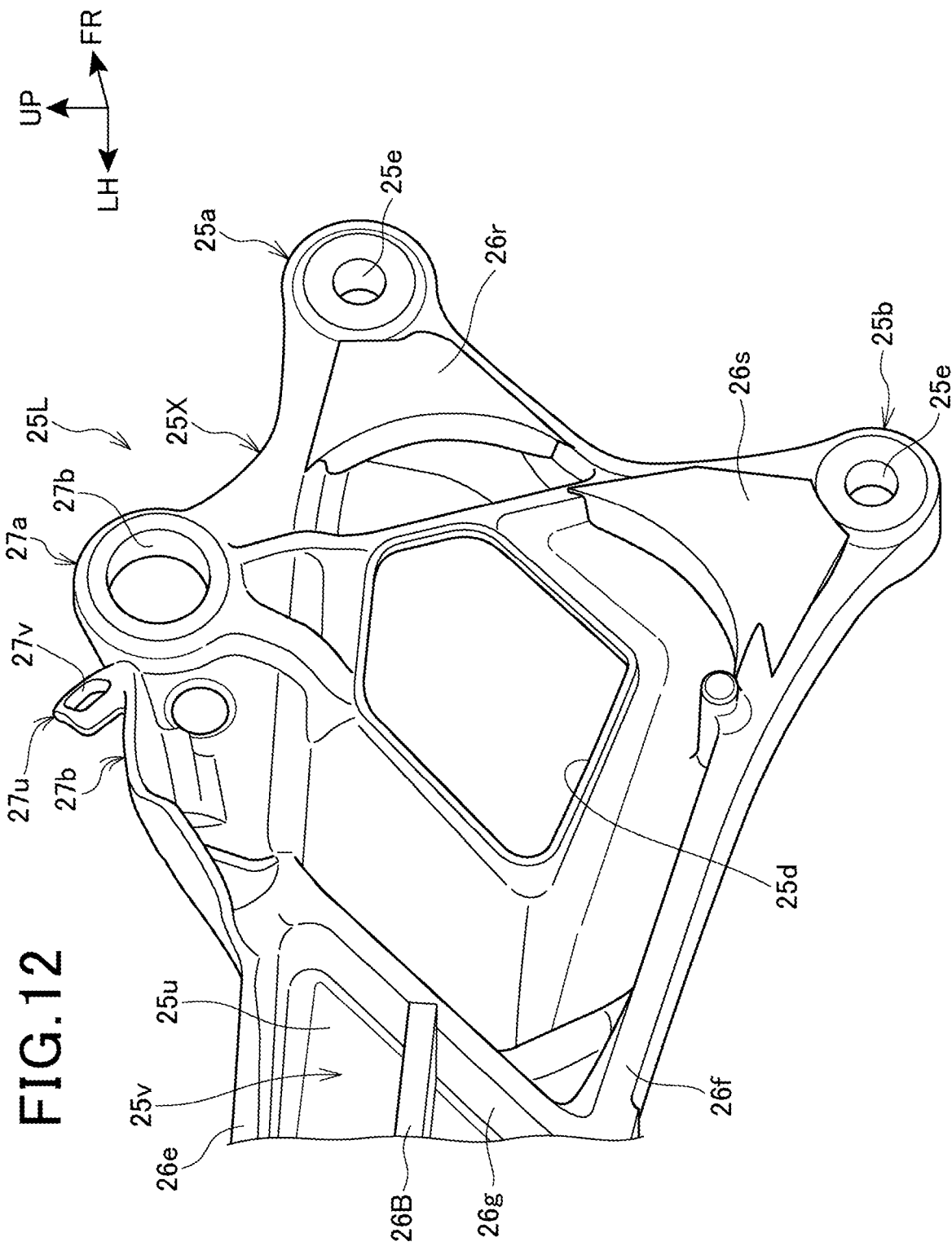
FIG. 12 is a perspective view illustrating the inner surface in a front portion of the left side frame half body.

FIG. 10 is a right side view illustrating an inner surface 25u of the left side frame half body 25L. FIG. 11 is a perspective view illustrating the inner surface 25u and a lateral cross-sectional surface of the left side frame half body 25L. FIG. 12 is a perspective view illustrating the inner surface 25u in the front portion of the left side frame half body 25L.

As illustrated in FIG. 10 and FIG. 11, the left side frame half body 25L includes a sidewall 25v, and an edge rib 26A, a center rib 26B, and a longitudinal rib group 26C. The sidewall 25v has the inner surface 25u. The edge rib 26A, the center rib 26B, and the longitudinal rib group 26C are integrally formed on the inner surface 25u of the sidewall 25v so as to project inward in the vehicle width direction.

The edge rib 26A includes an upper rib 26e and a lower rib 26f formed on an upper edge and a lower edge of the sidewall 25v.

The upper rib 26e and lower rib 26f are formed from the front portion 25X of the left side frame half body 25L to the rear portion 25Z (excluding the rear end joint portion 25c of the rear portion 25Z). A distance between the upper rib 26e and the lower rib 26f in the vertical direction gradually decreases from the front portion 25X toward the rear portion 25Z.

The center rib 26B is formed between the upper rib 26e and the lower rib 26f from a front inclined rib 26g disposed on the inner surface 25u of the front portion 25X to the rear portion 25Z (excluding the rear end joint portion 25c of the rear portion 25Z).

Here, in FIG. 11, assume that the sidewall 25v, upper rib 26e, lower rib 26f, and center rib 26B have thicknesses T1, T2, T3, and T4, respectively. The center rib 26B is located on a position having equal distances L from the center of the thickness T1 of the upper rib 26e and the center of the thickness T2 of the lower rib 26f.

That is, in FIG. 10, when a center line 75 is drawn on a position at equal distances from the upper rib 26e and the lower rib 26f, the linearly formed center rib 26B is located on the center line 75.

In FIG. 10 and FIG. 11, the longitudinal rib group 26C includes a plurality of ribs disposed between the upper rib 26e and the lower rib 26f, including the front inclined rib 26g, a rear inclined rib 26h, and a plurality of longitudinal ribs 26j, 26k, 26m, 26n, 26p, and 26q.

The upper rib 26e, lower rib 26f, and center rib 26B are each formed to have a height from the inner surface 25u gradually decreasing from the front portion 25X toward the rear portion 25Z. The heights of the upper rib 26e, lower rib 26f, and center rib 26B are approximately identical at an identical position in the front-rear direction. The thicknesses of the upper rib 26e, lower rib 26f, and center rib 26B are approximately identical.

The sidewall 25v, upper rib 26e, and lower rib 26f are formed to have a U-shaped cross section, and the sidewall 25v, upper rib 26e, lower rib 26f, and center rib 26B are formed to have an E-shaped cross section. The thickness T1 of the sidewall 25v is smaller than the thickness T2 of the upper rib 26e (T1<T2).

The front inclined rib 26g is formed on the front portion 25X, and the rear inclined rib 26h is formed on the middle portion 25Y.

The front inclined rib 26g inclines upwardly toward the front, and the rear inclined rib 26h inclines upwardly toward the rear. The heights of the front inclined rib 26g and rear inclined rib 26h from the inner surface 25u are identical to the heights of the upper rib 26e and lower rib 26f at a coupling portion of the upper rib 26e and lower rib 26f. The heights of the front inclined rib 26g and rear inclined rib 26h from the inner surface 25u gradually decrease from the upper rib 26e and lower rib 26f toward the center rib 26B.

The plurality of longitudinal ribs 26j, 26k, 26m, 26n, 26p, and 26q each extend in the vertical direction so as to couple the upper rib 26e to the lower rib 26f, and intersect with the center rib 26B.

The plurality of longitudinal ribs 26j, 26k, 26m, 26n, 26p, and 26q gradually decrease in length as approaching the vehicle rear side. Among the plurality of longitudinal ribs 26j, 26k, 26m, 26n, 26p, and 26q, the longitudinal ribs 26j, 26k, 26m, and 26p have the heights from the inner surface 25u identical to that of the center rib 26B. The longitudinal ribs 26n and 26q have the heights from the inner surface 25u smaller than those of the longitudinal ribs 26j, 26k, 26m, and 26p on the upper rib 26e side, and larger on the lower rib 26f side.

As described above, disposing the front inclined rib 26g and rear inclined rib 26h on the front portion 25X and middle portion 25Y ensures enhanced flexural rigidity in the vertical direction of, especially, the front portion 25X and middle portion 25Y. Furthermore, disposing the plurality of longitudinal ribs 26j, 26k, 26m, 26n, 26p, and 26q over the entire left side frame half body 25L ensures the enhanced rigidity of the left side frame half body 25L. Accordingly, the thickness T1 of the sidewall 25v can be decreased.

The stay fastening portions 27m and 27n are formed to be thinner than the lower rib 26f. Even the stay fastening portions 27m and 27n as the thin portions are thin-walled, the strength and rigidity are ensured by the die-cast molding.

As illustrated in FIG. 10 and FIG. 11, the center ribs 26B as the ribs are disposed inside the sidewalls 25v as the wall portions of the left side frame half body 25L and the right side frame half body 25R. The center ribs 26B extend in longitudinal directions of the left side frame half body 25L and the right side frame half body 25R, and the center ribs 26B are disposed between the upper boss portions 25f and 25j and the pair of inner boss portions 25h, as the fastening portions for the two upper cross member 65 and lower cross member 66, respectively.

With this configuration, disposing the center rib 26B between the upper boss portions 25f and 25j and the pair of inner boss portions 25h ensures dispersing a load applied to the upper boss portions 25f and 25j and the pair of inner boss portions 25h to the center rib 26B side. Accordingly, the strength and rigidity of the left side frame half body 25L and the right side frame half body 25R are sufficiently ensured.

The left side frame half body 25L and the right side frame half body 25R have the U-shaped cross sections, and the center ribs 26B are disposed on the center lines 75 of the U shapes.

With this configuration, forming the left side frame half body 25L and the right side frame half body 25R to have the U-shaped cross section ensures the enhanced strength and rigidity of the left side frame half body 25L and the right side frame half body 25R. This ensures the thinned left side frame half body 25L and the thinned right side frame half body 25R (for example, the thinned sidewall 25v). Furthermore, disposing the center rib 26B ensures the sufficient strength and rigidity of the left side frame half body 25L and the right side frame half body 25R.

As illustrated in FIG. 12, padding portions 26r and 26s in approximately trapezoidal shapes in side view are disposed on the front portion 25X of the left side frame half body 25L, specifically, on the inner surface 25u of the sidewall 25v and between the main-frame-portion mounted portions 25a and 25b, and the opening 25d.

Thus, even if the opening 25d is provided near the main-frame-portion mounted portions 25a and 25b, the main-frame-portion mounted portions 25a and 25b can be reinforced by the padding portions 26r and 26s. Then, the strength and rigidity of the front portion 25X can be enhanced.

The cover member fastening portion 27b includes a rubber supporting portion 27u on an inner end portion in the vehicle width direction. The rubber supporting portion 27u supports a rubber (not illustrated) that abuts on the rear end portion of the fuel tank 43 (see FIG. 1). The rubber supporting portion 27u includes a rubber insertion hole 27v into which the rubber is inserted.

In this embodiment, the seat frame 25 is made of a magnesium alloy, and the fastening portions and supporting portions for vehicle equipment (fuel tank 43 (see FIG. 1), cover member, seat 17 (see FIG. 1), belt, stay, bracket, rubber, and similar component) are integrally formed. This reduces the number of components and the man-hour for assembly of the motorcycle 10 (see FIG. 1), and ensures sufficient weight reduction.

As illustrated in FIG. 2 to FIG. 4 described above, the present invention relates to the seat frame structure of the motorcycle 10 as the saddle riding vehicle that includes the main frame 22 and the magnesium alloy seat frame 25 fastened to the main frame 22.

The seat frame 25 extends rearward from the main frame 22. The seat frame 25 is a casting divided into right and left two parts, and includes the upper cross member 65 and the lower cross member 66 as at least two cross members. The upper cross member 65 and the lower cross member 66 couple the left side frame half body 25L and the right side frame half body 25R as the divided left and right divided portions one another.

The two upper cross member 65 and lower cross member 66 are each fastened to the left side frame half body 25L and the right side frame half body 25R with the bolts 67 and 68 as fastening members. The seat 17 is located above at least one upper cross member 65, the left side frame half body 25L, and the right side frame half body 25R. The other lower cross member 66 faces the one upper cross member 65.

With this configuration, since the seat frame 25 is the casting divided into right and left two parts, the mold for the die-cast molding can be downsized, thus reducing restriction due to the molding method. Accordingly, the strength and rigidity of the left side frame half body 25L and the right side frame half body 25R themselves are easily ensured. Coupling the left side frame half body 25L to the right side frame half body 25R with the upper cross member 65 and the lower cross member 66 ensures reinforcement of the left side frame half body 25L and the right side frame half body 25R. Accordingly, the sufficient strength and rigidity for the seat frame 25 are ensured.

As illustrated in FIG. 2 and FIG. 12, the padding portions 26r and 26s are formed near the main-frame-portion mounted portions 25a and 25b as the fastening portions of the left side frame half body 25L and the right side frame half body 25R to the main frame 22. With this configuration, the sufficient strength and rigidity are ensured at the main-frame-portion mounted portions 25a and 25b as the fastening portions of the left side frame half body 25L and the right side frame half body 25R to the main frame 22.

The above-described embodiment is given to merely illustrate an aspect of the present invention, and any modification and application are possible without departing from the spirit of the present invention.

The present invention is also applicable to a saddle riding vehicle in addition to the motorcycle 10, not limited to the case where the present invention is applied to the motorcycle 10. The saddle riding vehicle includes vehicles in general on which a rider straddles a vehicle body to get on, and a vehicle including not only the motorcycle 10 (including a motorized bicycle), but also a three-wheeled motorcycle that has two wheels as front wheels or rear wheels among the front and rear wheels and a three-wheeled vehicle or a four-wheeled vehicle classified in an All Terrain Vehicle (ATV).

REFERENCE SIGNS LIST

10 . . . Motorcycle (saddle riding vehicle)
17 . . . Seat
22 . . . Main frame
25 . . . Seat frame
25a, 25b . . . Main-frame-portion mounted portion (fastening portion)
25c . . . Rear end joint portion (rear end portion)
25f, 25j . . . Upper boss portion (fastening portion)
25h . . . Inner boss portion (fastening portion)
25L . . . Left side frame half body (divided portion)
25R . . . Right side frame half body (divided portion)
25v . . . Sidewall (wall portion)
26B . . . Center rib (rib)
26r, 26s . . . Padding portion
65 . . . Upper cross member (cross member)
66 . . . lower cross member (cross member)
75 . . . Center line

The invention claimed is:

1. A seat frame structure for a saddle riding vehicle, the saddle riding vehicle including a main frame and a seat frame made of a magnesium alloy, the seat frame being fastened to the main frame,
wherein the seat frame extends rearward from the main frame,
the seat frame is a casting divided into right and left parts, the seat frame includes a left side frame half body, a right side frame half body, an upper cross member, and a lower cross member, wherein the upper and lower cross members couple the left side frame half body to the right side frame half body,
each of the left side frame half body and the right side frame half body include a rear end joint portion that is formed integrally with a rear end portion of the left side frame half body and the right side frame half body, respectively, and wherein the left side frame half body rear end joint portion and the right side frame half body rear end joint portion are directly joined to one another,
the upper cross member is fastened to an upper surface the left side frame half body and the right side frame half body with fastening members,
a seat is located above the upper cross member, the left side frame half body, and the right side frame half body, and wherein at least a part of the upper cross member and the lower cross member are overlapping from a top view.

2. The seat frame structure for the saddle riding vehicle according to claim 1,
wherein the left side frame half body and right side frame half body are divided into right and left on a center in a vehicle width direction.

3. The seat frame structure for the saddle riding vehicle according to claim 2,
wherein the each of the left side frame half body and right side frame half body has a wall portion inside which a rib is disposed, the rib extends in a longitudinal direction of the left side frame half body and right side frame half body, and the rib is disposed between respective fastening portions for the upper and lower cross members.

4. The seat frame structure for the saddle riding vehicle according to claim 2,
wherein a padding portion is formed near a location where the left side frame half body and right side frame half body is fastened to the main frame.

5. The seat frame structure for the saddle riding vehicle according to claim 1,
wherein the each of the left side frame half body and right side frame half body has a wall portion inside which a rib is disposed, the rib extends in a longitudinal direction of left side frame half body and right side frame half body, and the rib is disposed between respective fastening portions for the upper and lower cross members.

6. The seat frame structure for the saddle riding vehicle according to claim 5,
wherein the each of the left side frame half body and right side frame half body has a U-shaped cross section, and the rib is disposed on a center line of the U shape.

7. The seat frame structure for the saddle riding vehicle according to claim 6,
wherein a padding portion is formed near a location where the left side frame half body and right side frame half body is fastened to the main frame.

8. The seat frame structure for the saddle riding vehicle according to claim 5,
wherein a padding portion is formed near a location where the left side frame half body and right side frame half body is fastened to the main frame.

9. The seat frame structure for the saddle riding vehicle according to claim 1,
wherein a padding portion is formed near a fastening portion of the left side frame half body and right side frame half body to the main frame.

10. The seat frame structure for the saddle riding vehicle according to claim 1,
wherein a front edge and a rear edge of the upper cross member and a lower cross member in a front-rear direction of the vehicle are bent either upward or downward in a vertical direction.

* * * * *